(12) United States Patent
Lee

(10) Patent No.: US 6,494,808 B2
(45) Date of Patent: Dec. 17, 2002

(54) METHOD USED IN AUTOMATIC TRANSMISSION FOR CONTROLLING SHIFTING INTO NEUTRAL

(75) Inventor: Hee-yong Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 9 days.

(21) Appl. No.: 09/751,439

(22) Filed: Dec. 29, 2000

(65) Prior Publication Data

US 2001/0041646 A1 Nov. 15, 2001

(30) Foreign Application Priority Data

May 9, 2000 (KR) ........................................ 2000-24642

(51) Int. Cl.$^7$ .............................................. B60K 41/04
(52) U.S. Cl. ........................................... 477/94; 477/45
(58) Field of Search ....................... 477/94, 95

(56) References Cited

U.S. PATENT DOCUMENTS

| 4,955,255 A | * | 9/1990 | Yamaashi et al. | 477/94 |
| 4,965,728 A | * | 10/1990 | Leising et al. | 477/94 |
| 5,272,630 A | * | 12/1993 | Brown et al. | 477/94 |
| 6,269,295 B1 | * | 7/2001 | Gaugush et al. | 701/55 |

* cited by examiner

Primary Examiner—Matthew C. Graham
(74) Attorney, Agent, or Firm—Christie, Parker & Hale, LLP

(57) ABSTRACT

Disclosed is a method used in an automatic transmission for controlling shifting into neutral when a vehicle is stopped in a first speed. The method provides for shifting in neutral when a brake of the vehicle has been depressed by the driver, the vehicle speed is less than a predetermined speed, the grade of a road is greater than a predetermined value, the throttle valve opening is 0%, the shift speed is a first speed of a drive D range or a drive D2 range, the oil temperature is greater than a predetermined temperature, the engine rpm Ne is within a predetermined rpm range, the output rpm of the transmission is 0 rpm, and the turbine rpm of a torque converter is 0 rpm.

9 Claims, 4 Drawing Sheets

METHOD USED IN AUTOMATIC TRANSMISSION FOR CONTROLLING SHIFTING INTO NEUTRAL

CROSS-REFERENCE TO RELATED APPLICATION

This application claims priority of Korea patent Application No. 2000-24642, filed on May 9, 2000.

BACKGROUND OF THE INVENTION (a) Field of the Invention

The present invention relates to a method used in an automatic transmission for controlling shifting into neutral when the vehicle is stopped in a first speed. More particularly, the present invention relates to a method for shifting an automatic transmission into neutral when stopped in a first speed such that fuel efficiency is improved, and a load of a torque converter is reduced to minimize noise and vibrations, thereby enhancing a ride feel.

(b) Description of the Related Art

In an automatic transmission used for vehicles, a shift control system performs control to realize automatic shifting into different speeds and shift ranges according to various factors such as throttle opening, vehicle speed and load, and several engine and driving conditions detected through a plurality of sensors. That is, based on such factors, the shift control system controls a plurality of solenoid valves of a hydraulic control system such that hydraulic flow in the hydraulic control system is controlled, resulting in the shifting of the transmission into the various speeds and shift ranges.

In addition, when the driver manipulates a shift lever to a particular shift range, a manual valve of the hydraulic control system undergoes port conversion as a result of the manual valve being indexed with the shift lever. By this operation, hydraulic pressure supplied from a hydraulic pump selectively engages a plurality of friction elements of a gearshift mechanism according to the duty control of the solenoid valves, thereby realizing shifting into the desired shift range.

In such an automatic transmission, shift quality is determined by how smoothly the friction elements are engaged and disengaged. Namely, when changing shift ranges, and speeds within the ranges, the timing between the engagement of a specific set of friction elements in relation to the disengagement of another specific set of friction elements determines the shift quality of the automatic transmission. Accordingly, there have been ongoing efforts to develop improved shift control methods that enhance shift quality by better controlling the timing of the friction elements to engaged and disengaged states.

When the vehicle is stopped for a relatively short period of time (e.g., when at a red light), the driver depresses the brake pedal rather than shifting into neutral or the parking range. This forcefully stops a powertrain of the automatic transmission while in a first speed such that a rotational force of the engine is absorbed by a slip operation in a torque converter. However, by maintaining the above state in which the engine rotational force is absorbed by the slip operation in the torque converter, a substantial load is generated in the torque converter. As a result, noise and vibrations are generated so that a ride feel is reduced when stopped. Fuel consumption is also increased.

SUMMARY OF THE INVENTION

The present invention has been made in an effort to solve the above problems.

It is an object of the present invention to provide a method used in an automatic transmission for controlling shifting into neutral when the vehicle is stopped in a first speed such that fuel efficiency is improved, and so that a load of a torque converter is reduced to minimize noise and vibrations, thereby enhancing a ride feel when stopped.

To achieve the above object, the present invention provides a method used in an automatic transmission for controlling shifting into neutral when the vehicle is stopped in a first speed. The method comprises the steps of (a) determining if a vehicle speed is less than a predetermined speed; (b) determining if a grade in the road is greater than a predetermined value if the vehicle speed is less than the predetermined speed; (c) determining if a throttle valve opening is 0% if the grade of the road is greater than the predetermined value; (d) determining if a present shift speed is a first speed of a drive D range or a drive D2 range if the throttle valve opening is 0%; (e) determining if an oil temperature is greater than a predetermined temperature if the present shift speed is the first speed in the drive D range or D2 range; (f) determining if present engine rpm Ne is within a predetermined range if the oil temperature is greater than the predetermined temperature; (g) determining if output rpm of the transmission is 0 rpm if the present engine rpm is within the predetermined range; (h) determining if turbine rpm of a torque converter is 0 rpm if the output rpm of the transmission is 0 rpm; (i) determining if a brake has been depressed by the driver if the turbine rpm of the torque converter is 0 rpm; and (j) performing control into neutral if the brake has been depressed by the driver, then returning to step (c) of determining if the throttle valve opening is 0%.

If the vehicle speed is greater than the predetermined speed in step (a), a present shift state is maintained; if the grade in the road is less than the predetermined value in step (b), it is determined if the grade in the road is less than 0%, and if it is, the present shift state is maintained, and if it is not, the process is returned to step (b). Also, if any one of the conditions of steps (c) through (i) is not satisfied, N-D shifting is performed.

According to a feature of the present invention, the predetermined speed of step (a) is 30 km/h.

According to another feature of the present invention, the predetermined value of step (b) is 3.5%.

According to yet another feature of the present invention, the predetermined temperature of step (e) is 20° C.

According to still yet another feature of the present invention, the predetermined range of step (f) is between 350 rpm and 1000 rpm.

According to still yet another feature of the present invention, after control into neutral of step (j) is performed, it is determined if a difference in the turbine rpm and the output rpm is greater than 100 rpm, and if the difference in rpm is greater than 100 rpm, an ECU controls an air intake controller and an ignition timing controller such that idle control in the neutral range is performed, and if the difference in rpm less than or equal to 100 rpm, the ECU controls the air intake controller and the ignition timing controller such that idle control in the drive D range is performed.

According to still yet another feature of the present invention, the predetermined rpm is 100 rpm.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
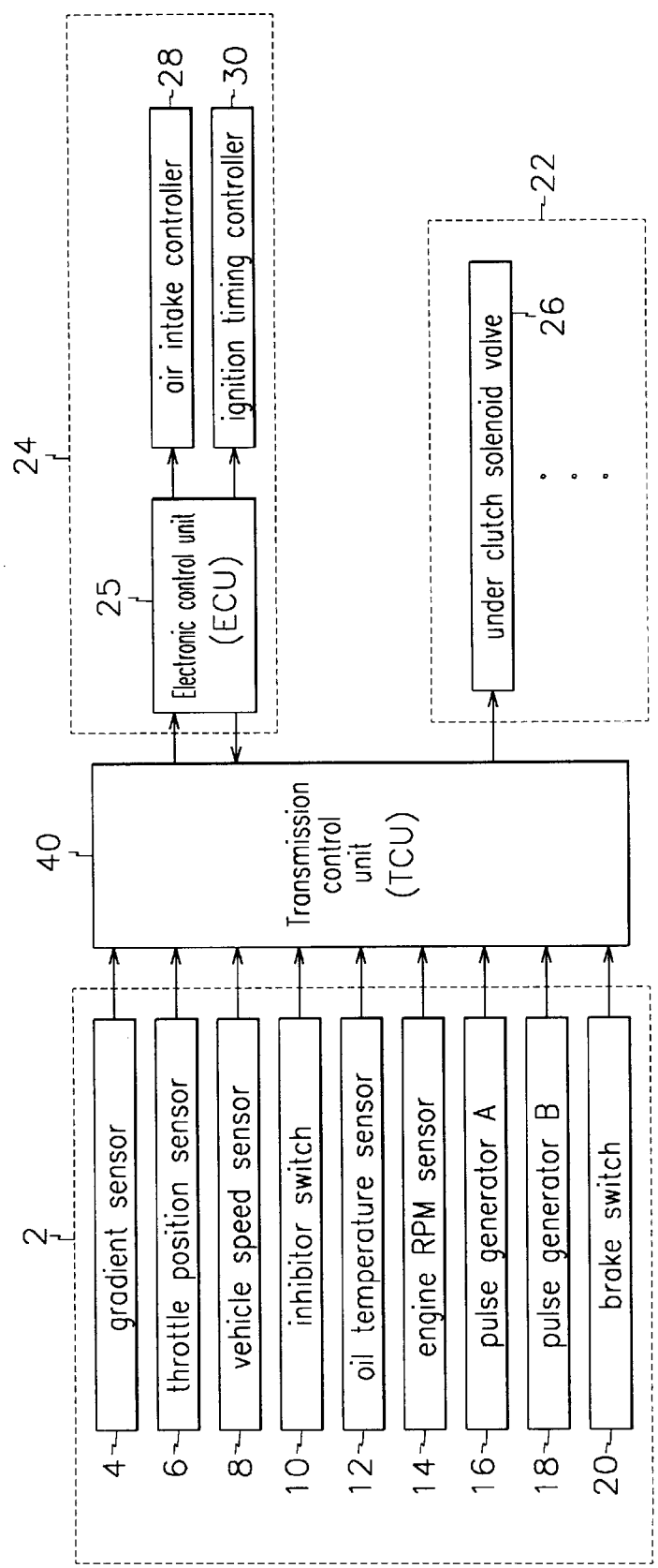
FIG. 1 is a block diagram of a shift control system to which a method of the present invention is applied.

FIG. 1 shows a block diagram of a shift control system to which a method of the present invention is applied.

The shift control system comprises a vehicle state detection unit 2, a transmission control unit (TCU) 40, a shift drive unit 22, and an engine controller 24. The vehicle state detection unit 2 includes a gradient sensor 4, throttle position sensor 6, a vehicle speed sensor 8, an inhibitor switch 10, an oil temperature sensor 12, an engine rpm sensor 14, pulse generators 16 and 18, and a brake switch 20. The elements of the vehicle state detection unit 2 output signals corresponding to various detections and on/off states.

The TCU 40 receives the signals from the vehicle state detection unit 2, then compares the signals using pre-installed data to perform an analysis of the signals. Based on the results of the analysis, the TCU 40 controls the shift drive unit 22 such that selective solenoid valves comprising the shift drive unit 22 are operated, thereby effecting shifting. The TCU 40 shares information with the engine controller 24.

The gradient sensor 4 detects a gradient in the road the vehicle is travelling on, both in front and to the rear of the vehicle; the throttle position sensor 6 detects a degree of throttle valve opening; the vehicle speed sensor 8 detects a present speed of the vehicle; the inhibitor switch 10 detects a present position of a driver-operated select lever; the oil temperature sensor 12 detects an oil temperature; the engine rpm sensor 14 detects engine rpm; the pulse generators 16 and 18 detect a turbine rpm and an output rpm, respectively; and the brake switch 20 detects whether the driver has depressed the brake pedal.

The shift drive unit 22 comprises solenoid valves provided in the transmission. In the present invention, since only an under clutch solenoid valve 26, which controls a control pressure of an under clutch, is of interest, this is the only solenoid valve that appears in the drawing.

The engine controller 24 includes an engine control unit 25 that shares information with the TCU 40, an air intake controller 28 for controlling the intake of air into the engine, and an ignition timing controller 30 for controlling ignition timing. The engine controller 24 can restrict variations in engine rpm.

Figure 2:
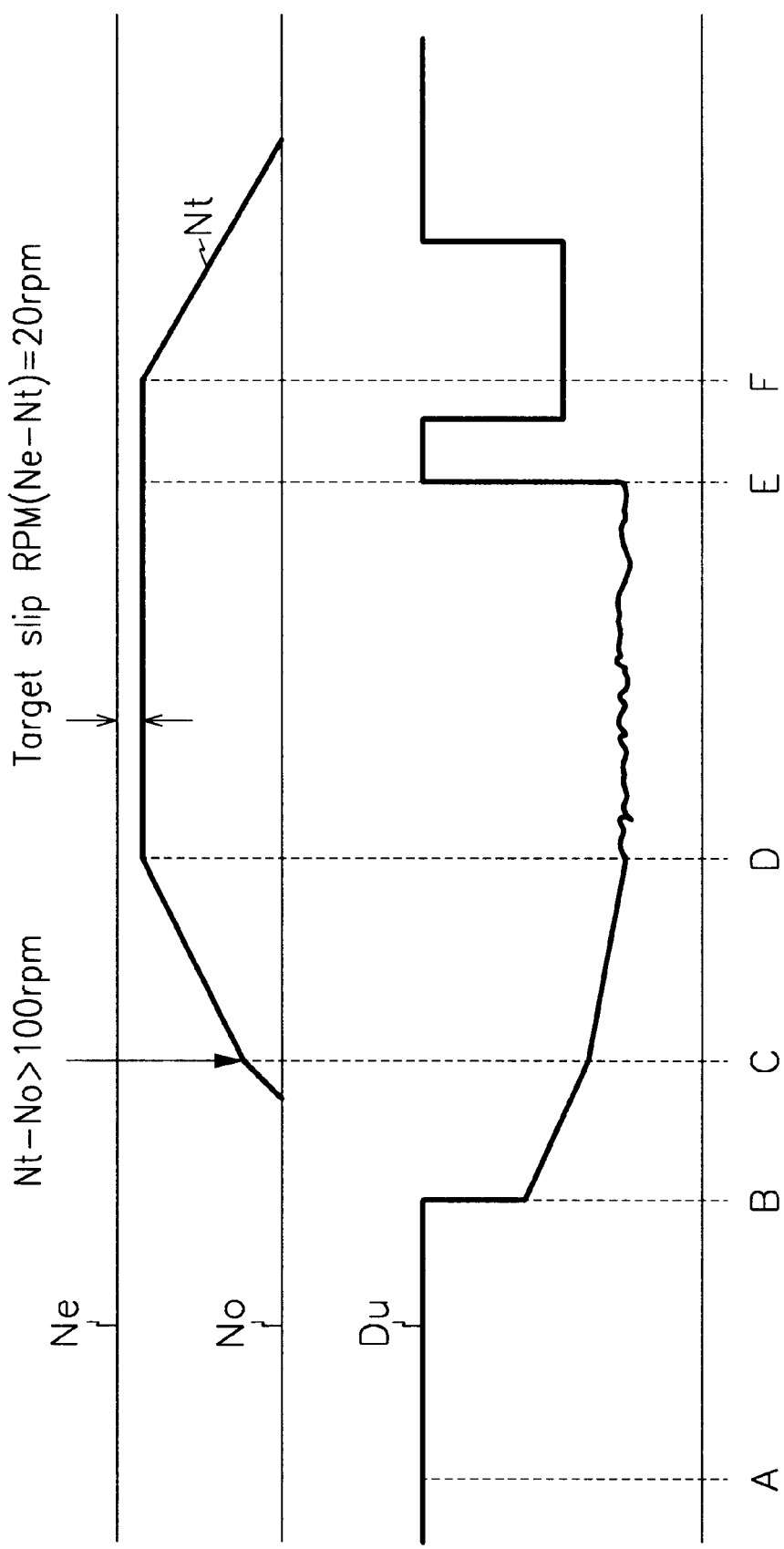
FIG. 2 is a chart of a duty pattern resulting from the application of a method of the present invention.

FIG. 2 shows a chart of a duty pattern resulting from the application of a method of the present invention. In the drawing, Ne is engine rpm, Nt is turbine rpm of the torque converter, No is output rpm of the automatic transmission, and DU is the duty pattern.

If it is determined from the driving conditions that shifting into neutral from the first speed is required (interval A-B), a portion of an operational pressure of the under clutch, which maintains the first speed, is quickly released for a predetermined period (interval B-C), then a portion is again released slowly (interval C-D). Next, using a feedback control of a duty calculation period of 65 msec, a minimal duty pressure is maintained (interval D-E) to realize control into neutral. In this state, if it is determined that shifting out of neutral is required, duty control is performed so that hydraulic pressure is again supplied to the under clutch (interval E-F), thereby realizing N-D control.

Figure 3:
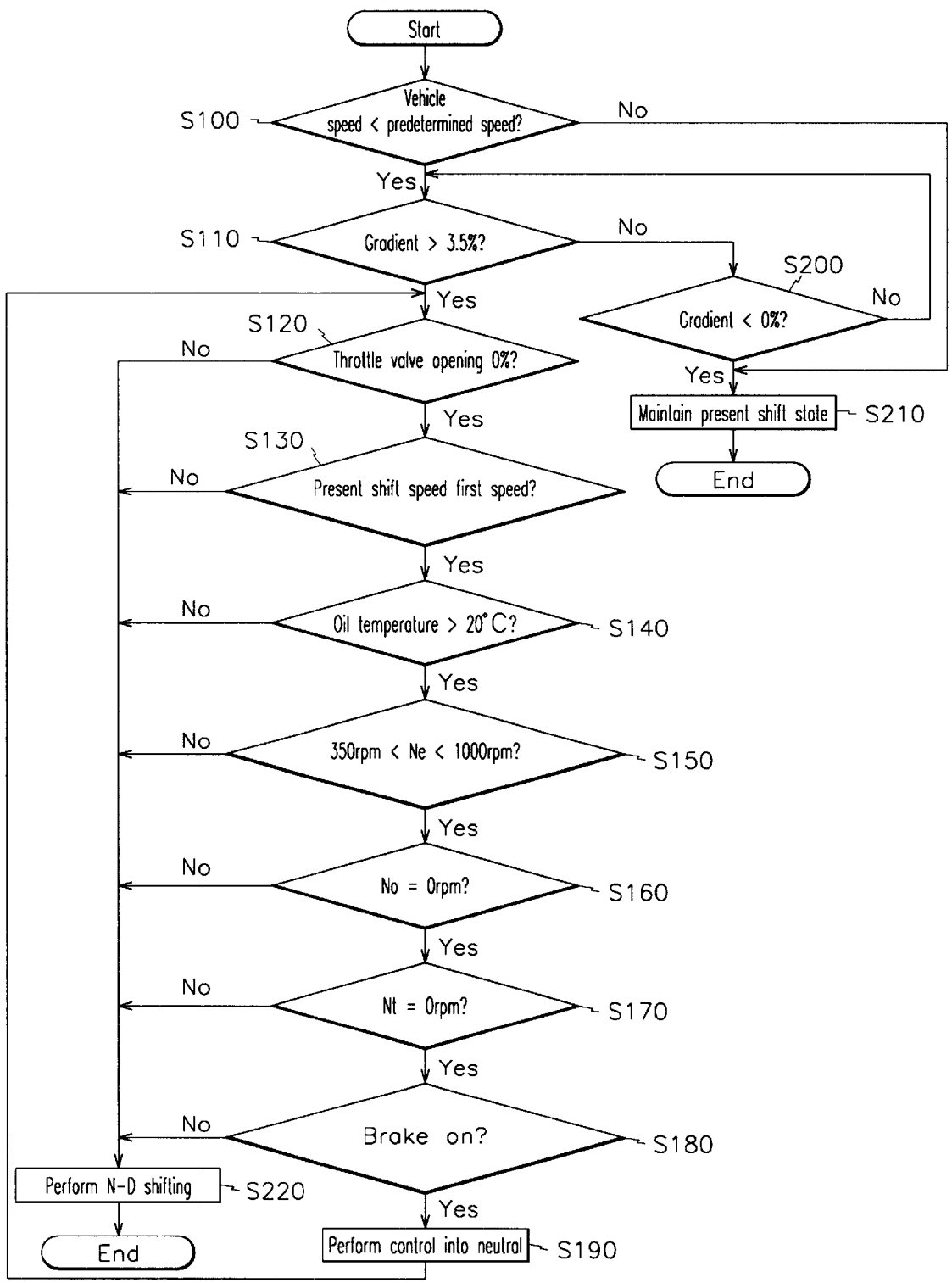
FIG. 3 is a flow chart of a method used in an automatic transmission for controlling shifting into neutral when the vehicle is stopped in a first speed according to a first preferred embodiment of the present invention.

FIG. 3 shows a flow chart of a method used in an automatic transmission for controlling shifting into neutral when the vehicle is stopped in a first speed according to a first preferred embodiment of the present invention.

First, it is determined if the vehicle speed is less than a predetermined speed of, for example, 30 km/h in step S100. If the vehicle speed is at or above the predetermined speed, a present shift state is maintained in step S210. However, if the vehicle speed is less than the predetermined speed, it is determined, using signals from the gradient sensor 4, if the grade in the road the vehicle is travelling on is greater than 3.5% in step S110. If the gradient is not greater than 3.5%, it is determined if the grade in the road is less than 0% in step S200. If the gradient is less than 0%, the present shift state is maintained in step S210, and if the gradient is not less than 0%, step S110 is repeated.

If the grade of the road is greater than 3.5% in step S110, it is determined, using signals from the throttle position sensor 6, if the throttle valve opening is 0% in step S120. Next, if the throttle valve opening is 0%, it is determined if the present shift speed is a first speed in a drive D range or drive D2 range in step S130. If the present shift speed is the first speed in the drive D or D2 range, it is determined if the oil temperature is greater than 20° C. in step S140. If the oil temperature is greater than 20° C., it is determined if the present engine rpm Ne is greater than 350 rpm and less than 1000 rpm in step S150.

If it is determined that the present engine rpm Ne is within the predetermined range of step S150, it is then determined in step S160 if the output rpm No of the transmission is 0 rpm. If the output rpm of the transmission is 0 rpm, it is determined if the turbine rpm Nt of the torque converter is 0 rpm in step S170. If the turbine rpm Nt of the torque converter is 0 rpm, it is determined, from the signals output by the brake switch 20, if the brake is on (i.e., has been depressed by the driver) in step S190. If the brake is on, control into neutral is performed, after which the process is returned to step S120. In steps S120–S180, if the condition is not satisfied, N-D shifting is performed in step S220.

By the method described above, the transmission is shifted into neutral when stopped in the first speed such that the slip in the torque converter is maintained at approximately 20 rpm as shown in FIG. 2. Accordingly, the load of the torque converter is reduced such that noise and vibrations are minimized. Fuel consumption is also reduced.

Figure 4:
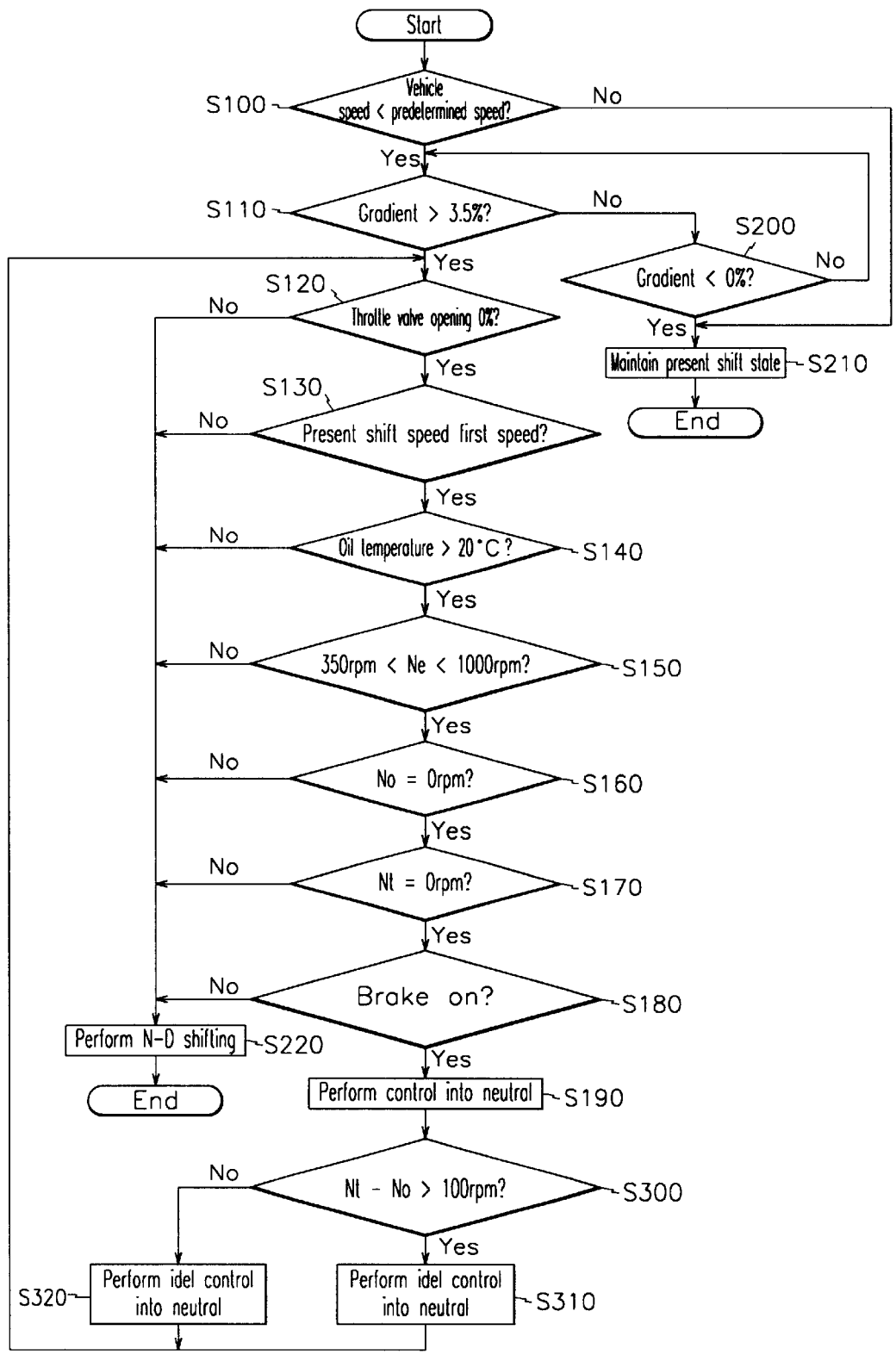
FIG. 4 is a flow chart of a method used in an automatic transmission for controlling shifting into neutral when the vehicle is stopped in a first speed according to a second preferred embodiment of the present invention.

FIG. 4 shows a flow chart of a method used in an automatic transmission for controlling shifting into neutral when the vehicle is stopped in a first speed according to a second preferred embodiment of the present invention. Only portions of this method that differ from the method of the first preferred embodiment of the present invention will be described.

In particular, after control into neutral of step S190 is performed, it is determined if a difference in the turbine rpm Nt and the output rpm No is greater than 100 rpm in step S300. If the difference in rpm is greater than 100 rpm, the ECU 25 controls the air intake controller 28 and the ignition timing controller 30 such that idle control in the neutral range is performed in step S310. However, if the difference in rpm is less than or equal to 100 rpm in step S300, idle control in the drive D range is performed in step S320.

In the method of the second preferred embodiment of the present invention, by limiting fluctuations in rpm, overall control is also achieved through the use of the ECU 25, thereby obtaining additional improvements in ride feel.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method used in an automatic transmission for controlling shifting into neutral when a vehicle is stopped in a first speed, the method comprising the steps of:

(a) determining if a vehicle speed is less than a predetermined speed;

(b) determining if a grade of a road is greater than a predetermined value if the vehicle speed is less than the predetermined speed;

(c) determining if a throttle valve opening is 0% if the grade of the road is greater than the predetermined value;

(d) determining if a shift speed is a first speed of a drive D range or a drive D2 range if the throttle valve opening is 0%;

(e) determining if an oil temperature is greater than a predetermined temperature if the present shift speed is the first speed in the drive D range or the drive D2 range;

(f) determining if engine rpm Ne is within a predetermined range if the oil temperature is greater than the predetermined temperature;

(g) determining if output rpm of the transmission is 0 rpm if the present engine rpm is within the predetermined range;

(h) determining if a turbine rpm of a torque converter is 0 rpm if the output rpm of the transmission is 0 rpm;

(i) determining if a brake has been depressed by a driver if the turbine rpm of the torque converter is 0 rpm; and (j) performing control into neutral if the brake has been depressed by the driver, then returning to step (c) of determining if the throttle valve opening is 0%.

2. The method of claim 1 wherein if the vehicle speed is greater than the predetermined speed in step (a), a present shift state is maintained; if the grade in the road is less than the predetermined value in step (b), it is determined if the grade in the road is less than 0%, and if it is, the present shift state is maintained, and if it is not, the process is returned to step (b).

3. The method of claim 1 wherein if any one of the conditions of steps (c) through (i) is not satisfied, N-D shifting is performed.

4. The method of claim 1 wherein the predetermined speed of step (a) is 30 km/h, the predetermined value of step (b) is 3.5%, the predetermined temperature of step (e) is 20° C., and the predetermined range of step (f) is between 350 rpm and 1000 rpm.

5. The method of claim 1 wherein after control into neutral of step (j) is performed, it is determined if a difference in the turbine rpm and the output rpm is greater than a predetermined rpm, and if the difference in rpm is greater than the predetermined rpm, an ECU controls an air intake controller and an ignition timing controller such that idle control in the neutral range is performed, and if the difference in rpm is less than or equal to the predetermined rpm, the ECU controls the air intake controller and the ignition timing controller such that idle control in the drive D range is performed.

6. The method of claim 5 wherein the predetermined rpm is 100 rpm.

7. The method of claim 1 wherein performing control into neutral comprises performing a feedback duty control of a hydraulic pressure supplied to an under clutch such that a slip in the torque converter is maintained at approximately a predetermined rpm.

8. The method of claim 7 further comprising using an ECU to control an air intake controller and an ignition timing controller for maintaining the slip in the torque converter at the predetermined rpm.

9. The method claim 8 wherein the predetermined rpm is about 20 rpm.

* * * * *

UNITED STATES PATENT AND TRADEMARK OFFICE
CERTIFICATE OF CORRECTION

PATENT NO.   : 6,494,808 B2
DATED        : December 17, 2002
INVENTOR(S)  : Hee-Yong Lee It is certified that error appears in the above-identified patent and that said Letters Patent is hereby corrected as shown below:

<u>Title page, Item [54] and Column 1,</u>
Title, replace "METHOD USED IN AUTOMATIC TRANSMISSION FOR CONTROLLING SHIFTING INTO NEUTRAL" with -- CONTROL METHOD FOR SHIFTING AN AUTOMATIC TRANSMISSION INTO NEUTRAL --.

Signed and Sealed this

Eighteenth Day of May, 2004

JON W. DUDAS
*Acting Director of the United States Patent and Trademark Office*